(12) United States Patent
Goyal et al.

(10) Patent No.: US 12,192,215 B2
(45) Date of Patent: Jan. 7, 2025

(54) METHOD AND ARCHITECTURE FOR PROVIDING INTEGRATED DESIGN OF CYBER-PHYSICAL SYSTEM WITH WATERMARKING

(71) Applicant: Palo Alto Research Center Incorporated, Palo Alto, CA (US)

(72) Inventors: Raman Goyal, Mountain View, CA (US); Christoforos Somarakis, Gilroy, CA (US); Erfaun Noorani, Fairless Hill, PA (US); Aleksandar B. Feldman, Santa Cruz, CA (US); Shantanu Rane, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 205 days.

(21) Appl. No.: 17/939,577

(22) Filed: Sep. 7, 2022

(65) Prior Publication Data

US 2024/0080325 A1 Mar. 7, 2024

(51) Int. Cl.
*G06F 21/00* (2013.01)
*H04L 9/40* (2022.01)

(52) U.S. Cl.
CPC ...... *H04L 63/1416* (2013.01); *H04L 63/1425* (2013.01); *H04L 63/145* (2013.01); *H04L 63/30* (2013.01)

(58) Field of Classification Search
None
See application file for complete search history.

(56) References Cited

U.S. PATENT DOCUMENTS

| | | | |
|---|---|---|---|
| 7,523,311 B1 * | 4/2009 | Matsui | H04N 1/32309 713/176 |
| 8,249,350 B2 * | 8/2012 | Voloshynovskyy | G07D 7/005 713/176 |
| 8,667,275 B2 * | 3/2014 | Rhoads | G11B 20/00086 713/176 |
| 9,087,377 B2 * | 7/2015 | Hernandez-Avalos | H04N 19/467 |
| 10,826,932 B2 * | 11/2020 | Abbaszadeh | G06N 5/04 |
| 11,159,540 B2 * | 10/2021 | Abbaszadeh | H04L 63/1416 |

(Continued)

OTHER PUBLICATIONS

Pranatyasto, Toto Nugroho, and S. Joe Qin "Sensor Validation and process fault diagnosis for FCC units under MPC Feedback" Control Engineering Practice 9.8 (2001): 877-888, (Year: 2001).

*Primary Examiner* — Maung T Lwin

(57) ABSTRACT

Embodiments described herein provide a design architecture for co-designing a controller and a watermarking signal for a cyber-physical system. During operation, the architecture can determine, in conjunction with each other, respective values of a first set of parameters indicating operations of the controller and a second set of parameters representing the watermarking signal. Here, the watermarking signal is combinable with a control signal from the controller for monitoring an output signal of the cyber-physical system for detecting malicious data at different time instances. Subsequently, the architecture can determine a state manager for determining the states of the cyber-physical system from the monitored output signal based on the first and second sets of parameters. The architecture can also determine a detector capable of identifying presence of an attack from the states of the cyber-physical system at a plurality of time instances using the watermarking signal.

20 Claims, 8 Drawing Sheets

(56) References Cited

U.S. PATENT DOCUMENTS

| | | | |
|---|---|---|---|
| 11,361,055 B1* | 6/2022 | Levacher | G06F 21/16 |
| 2002/0078359 A1* | 6/2002 | Seok | G10L 19/018 |
| | | | 704/E19.009 |
| 2006/0031938 A1* | 2/2006 | Choi | H04L 63/1441 |
| | | | 726/25 |
| 2007/0300308 A1* | 12/2007 | Mishura | G06F 21/78 |
| | | | 726/27 |
| 2013/0117570 A1* | 5/2013 | Petrovic | G06T 1/0085 |
| | | | 713/176 |
| 2022/0217159 A1* | 7/2022 | Ito | H04W 12/121 |

\* cited by examiner

METHOD AND ARCHITECTURE FOR PROVIDING INTEGRATED DESIGN OF CYBER-PHYSICAL SYSTEM WITH WATERMARKING

BACKGROUND

Field

This disclosure is generally related to the field of system design. More specifically, this disclosure is related to a system and method for facilitating integrated system design for incorporating watermarked-based security in cyber-physical systems.

Related Art

A cyber-physical system can be a computer system that can be remotely controlled or monitored by a computing device, such as a hardware- or software-based controller. The controller can operate based on one or more algorithms that can control the cyber-physical system. The cyber-physical system can suffer anomalies (e.g., faults or malicious attacks) that can lead to disruption to the operations. Hence, quick and efficient methods of detection and isolation of the anomalies are necessary for operating the cyber-physical system.

An effective method of detecting anomalies, typically caused by malicious attacks (e.g., a replay attack), can include the use of watermarking signals for the cyber-physical system. Watermarking can be considered as a method of data authentication that infuses untraceable and unrepeatable signals, typically noise, with the output of the cyber-physical system. A cyber-physical system secured by watermarking can be referred to as a watermarked physical system (or watermarked system for short).

The presence of the watermarking signal can indicate whether an output of the watermarked system is the current output. In particular, the watermarked system supports a discrepancy between a replay signal and a current output signal because the corresponding watermarks on the respective signals can be different. However, since the watermarking signal is typically incorporated as extra noise, the overall performance of the watermarked system can degrade due to the watermarking process.

SUMMARY

Embodiments described herein provide a design architecture for co-designing a controller and a watermarking signal for a cyber-physical system. During operation, the architecture can determine, in conjunction with each other, respective values of a first set of parameters indicating operations of the controller and a second set of parameters representing the watermarking signal. Here, the watermarking signal is combinable with a control signal from the controller for monitoring an output signal of the cyber-physical system for detecting malicious data at different time instances. Subsequently, the architecture can determine a state manager for determining the states of the cyber-physical system from the monitored output signal based on the first and second sets of parameters. The architecture can also determine a detector capable of identifying presence of an attack from the states of the cyber-physical system at a plurality of time instances using the watermarking signal.

In a variation on this embodiment, the attack comprises replaying a previously recorded output of the cyber-physical system.

In a variation on this embodiment, determining the respective values of the first and second sets of parameters can include enhancing a first set of values of the first set of parameters for predetermined values of the second set of parameters. Subsequently, a second set of values of the second set of parameters can be enhanced for the enhanced first set of values.

In a further variation, the architecture can iterate the enhancement of the first and second sets of values until a convergence is reached.

In a further variation, the enhancement of the first set of values can correspond to a performance metric for the cyber-physical system. On the other hand, the enhancement of the second set of values can correspond to a detection rate for the attack.

In a variation on this embodiment, determining the respective values of the first and second sets of parameters can include identifying a first set of values of the first set of parameters for predetermined values of the second set of parameters. Here, the first set of values that can be associated with the controller is existing for the cyber-physical system. Subsequently, a second set of values of the second set of parameters can be enhanced for the identified first set of values.

In a variation on this embodiment, the state manager can include a Kalman filter for determining the states of the cyber-physical system.

In a variation on this embodiment, the detector can include a chi-square detector for detecting the attack.

In a variation on this embodiment, wherein the architecture can bound the respective values of the first set of parameters to a norm indicating that the controller is a stable dynamic feedback controller.

BRIEF DESCRIPTION OF THE FIGURES

In the figures, like reference numerals refer to the same figure elements.

DETAILED DESCRIPTION

Figure 1:
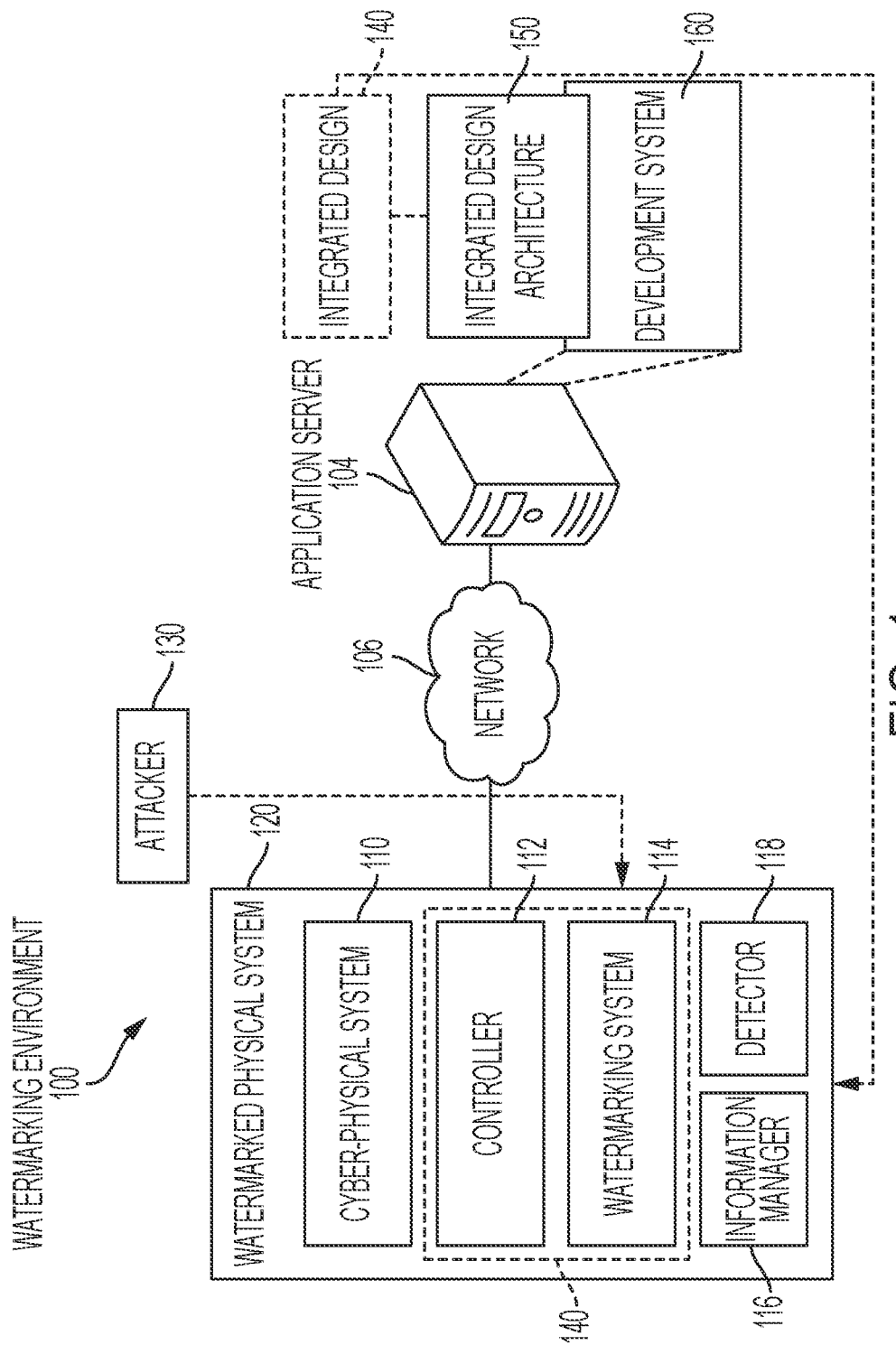
FIG. 1 illustrates an exemplary watermarking environment that includes a watermarked system provided by an integrated design, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of efficiently incorporating a watermarking process into a cyber-physical system by designing the controller of the system and the watermarking process in conjunction with each other. The watermarking process integrated with the cyber-physical system can be referred to as a watermarked system. An integrated design architecture (or framework) can support the design of the watermarked system by allowing the development of the controller and the watermarking process together. This integrated design architecture can provide a high detection rate for the watermarking process with a reduced impact on the controller.

With existing technologies, a watermarking signal can be infused with the input signal of the system. Typically, the watermarking signal can include randomness for ensuring that the signal is untraceable and unrepeatable. As a result, the watermarking signal can be used to detect replay attacks. In these attacks, a malicious actor, such as the attacker, can record the output signal for a duration and can replay the recording for the attack. Without the discrepancy provided by watermarking, an observer or user of the system may remain oblivious to the ongoing attack based on the replay. However, the watermarking signal is injected as added noise. Consequently, even though a strong watermarking signal can support a quick detection of the attack, such a signal can degrade the output signal of the system, thereby causing performance degradation for the system.

Since the controller generates the states of the system based on the output signal, a degraded output signal can adversely affect the operations of the controller. As a result, as the watermarking process becomes more effective, the performance degradation can become more significant. For example, the watermarking process for an existing controller can be adverse effects on the performance. Due to the competing nature of the controller and the watermarking process, the sequential integration of these two components may yield degraded performance of the system or an ineffective detection rate for the watermarking process.

To solve this problem, embodiments described herein provide an integrated design architecture (or framework) for developing the controller and the watermarking process in conjunction with each other. The design architecture allows a development system to jointly design and configure the controller and the watermarking process such that the watermarking process can facilitate a high detection rate while the controller can maintain a target performance level. In this way, the design architecture can ensure that an efficient watermarking process can be co-designed with the controller for the cyber-physical system.

However, if the controller is already designed for an existing system for a predefined strength of the watermarking signal, the controller cannot be co-designed for the system. The design architecture can then facilitate the enhancement of the watermarking signal without degrading the performance of the system. To do so, the design architecture can determine the performance level of the system. Subsequently, the design architecture can determine whether the watermarking signal can be further enhanced while maintaining the performance level.

During operation, the design architecture can obtain the system description, which can include the underlying system dynamics associated with the system. For example, if the system is a discrete-time linear time-invariant (LTI) system, the design architecture can determine the state of the system, the control input, which is the control signal from the controller based on the previous state of the system, a representation (or model) of the system noise (e.g., the noise associated with an actuator of the system), and the output of the system. The design architecture can also determine the attack model that can be mitigated with watermarking. The attack model can incorporate the properties of a replay attack, such as access to the output of the system and the capability to replay a previously recorded sequence of desired output of the system.

Based on the system dynamics and the attack model, the design architecture can determine a watermarking process that can generate a watermarking signal. The watermarking signal can be a signal injectable into the input of the system through one or more available channels associated with the system. The design architecture can determine the strength of the watermarking signal and the channels through which the signal can be added. The design architecture can also support the co-design of a dynamic and robust controller with a target control performance level. For example, the design architecture can design a dynamic controller to bound the $H_2$ norm, thereby ensuring that the controller is a stable dynamic feedback controller. The design architecture, thus, can facilitate the co-design of the controller and the watermarking process, thereby ensuring a high detection rate with a low-performance loss for the combined design.

Exemplary Watermarked System

FIG. 1 illustrates an exemplary watermarking environment that includes a watermarked system provided by an integrated design, in accordance with an embodiment of the present application. In this example, a watermarking environment 100 can include a cyber-physical system 110. A controller 112 can manage and control system 110 to generate an output based on a control or reference signal. In some embodiments, controller 112 can be a closed-loop low-level controller, such as proportional-integral-derivative (PID), model predictive control (MPC), and Linear Quadratic Gaussian (LQG) controller. Controller 112 can also be based on a trained AI model (e.g., a trained neural network).

With existing technologies, a watermarking system 114 can generate a watermarking system and infuse the watermarking signal with the output signal of system 110. Watermarking system 114 can be a hardware- or software-based signal generator that may generate a signal that may follow a distribution while being untraceable and unrepeatable. As a result, the watermarking signal can be used to detect replay attacks on system 110. In these attacks, a malicious actor can record the output signal of system 110 and can replay the recording for the attack. System 110, when deployed with watermarking system 114 for watermarking the output, can be referred to as watermarked physical system 120 (or watermarked system 120 for short).

Without the discrepancy provided by watermarking system 114, an observer or user of system 110 may remain oblivious to the ongoing attack based on the replay. Even though watermarking system 114 may provide robust protection against a replay attack, the watermarking signal generated by watermarking system 114 is injected as added noise to the output of system 110. Consequently, if watermarking system 114 can generate a strong watermarking signal for quick detection of the attack, such a signal can degrade the output signal of system 110, thereby causing performance degradation for system 110.

Since controller 112 generates the states of system 110 based on the output signal, a degraded output signal can adversely affect the operations of controller 112. As a result, as watermarking system 114 becomes more effective, system 110's performance degradation can become more significant. Due to the competing nature of controller 112 and watermarking system 114, the sequential integration of these two components may yield degraded performance of system 110 or an ineffective detection rate for watermarking system 114.

To solve this problem, an integrated design architecture 150 of a development system 160 can support the development of controller 112 and watermarking system 114 in conjunction with each other. Design architecture 150 can facilitate combined design 140 of controller 112 and watermarking system 114. Development system 160 can run on an application server 104 reachable via a network 106. Here, network 106 can be a local or wide area network, such as a virtual local area network (VLAN) or the Internet, respectively. Design architecture 150 allows development system 160 to jointly design and configure controller 112 and watermarking system 114 such that watermarking system 114 can facilitate a high detection rate while controller 112 can maintain a target performance level.

Subsequently, development system 160 can deploy controller 112 and watermarking system 114, developed based on combined design 140, for system 110 (via network 106). However, if controller 112 is already designed for system 110 for a predefined strength of a watermarking signal, controller 112 cannot be co-designed for system 110. Design architecture 150 can then facilitate the enhancement of the watermarking signal without degrading the performance of system 110. To do so, design architecture 150 can determine whether watermarking system 114 can be designed to further strengthen the watermarking signal while maintaining the performance level of system 110.

During operation, design architecture 150 can obtain the description of system 110, which can include the underlying system dynamics associated with system 110. For example, if system 110 is a discrete-time linear time-invariant (LTI) system, design architecture 150 can determine the state of system 110, the control input from controller 112 at a time instance. a representation of the actuator noise of system 110, and the output of system 110. The control signal from controller 112 can be based on the previous state (e.g., at a previous time instance) of system 110. Even though the examples described herein are based on linearized chemical processes, design architecture 150 can also be used for security, fault detection, and fault mitigation for general uncertainty or nonlinear systems, temperature control, SCADA and industrial systems, power grids, etc.

Design architecture 150 can also determine the attack model that can be mitigated by watermarking. For example, the attack model can incorporate the capabilities of an attacker 130 inflicting a replay attack. Such capabilities can include access to the output of system 100, the capability of recording the output, and the capability to replay a previously recorded output to achieve a sequence of desired malicious output of system 110. Based on the system dynamics and the attack model, design architecture 150 can determine a watermarking system 114 that can generate a watermarking signal. The watermarking signal can be a signal injectable into the input of system 110 through one or more available channels of system 110.

Design architecture 150 can determine the strength of the watermarking signal and the channels of system 110 through which the signal can be added. The design architecture can also support the co-design of controller 112 with a target control performance level. For example, design architecture 150 can design controller 112 to bound the $H_2$ norm, thereby ensuring that controller 112 is a stable dynamic feedback controller for system 110. Design architecture 150 can also design a separate information manager 116 (e.g., an estimator of a control system) and a detector 118 for system 110 to ensure robust control performance and detection of the attack.

In some embodiments, information manager 116 can operate as a state manager for system 110 and use a Kalman filter to calculate the states of system 110 based on the output of system 110. Furthermore, detector 118 can include a $\chi^2$ detector (i.e., a chi-square detector) for fault detection in system 110. Design architecture 150, thus, can facilitate the co-design of controller 112 and watermarking system 114 with a high detection rate with a low-performance loss for watermarked system 120.

System Architecture

Figure 2A:
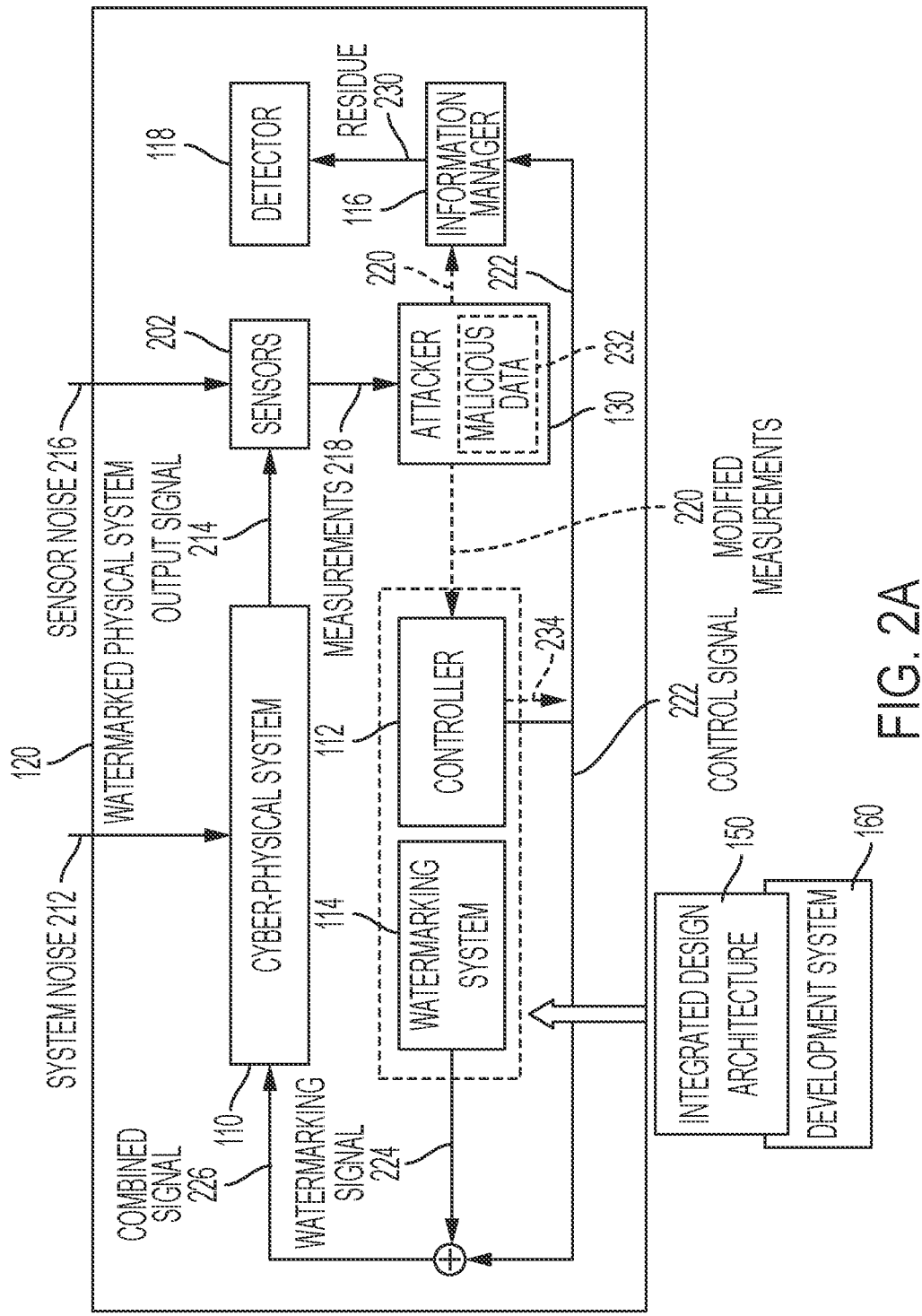
FIG. 2A illustrates an exemplary watermarked system provided by an integrated design, in accordance with an embodiment of the present application.

FIG. 2A illustrates an exemplary watermarked system provided by an integrated design, in accordance with an embodiment of the present application. In this example, system 110 is designed to produce an output signal 214 based on a combined signal 226. Here, combined signal 226 can be a combination (e.g., an addition) of control signal 222 (denoted as $U_k$) from controller 112 and watermarking signal 224 (denoted as $\Delta u_k$) from watermarking system 114. System 110's output signal 214 can be detected and used by sensors 202 to generate sensor measurements 218 (denoted as $y_k$).

Here, system 110 can be exposed to system noise 212 (denoted as $w_k$), which indicates imperfections associated with the operating mechanism of system 110. System noise 212 can also be referred to as process noise or actuator noise. Furthermore, the measurements from sensors 202 can also be impacted by noise 216 (denoted as $v_k$) produced by sensors 202. Here, a respective sensor may include fundamental inaccuracy due to noise sources (e.g., Gaussian noise).

Accordingly, if system 110 includes an LTI system, design architecture 150 can represent the state of system 110 at time k+1 based on $x_{k+1}=Ax_k+Bu_k+Dw_k$ and $y_k=Cx_k+v_k$, where x is the state of system 110, u is control signal 222, and w indicates system noise 212 with known statistics, and y is output signal 214. Design architecture 150 can also determine a representation (or model) for a malicious action, such as a replay attack, that can be performed by attacker 130 to harm system 110. Design architecture 150 can incorporate the properties of the attack.

For example, attacker 130 can have access to measured signal 218 in real-time and the capability to record measurements 218 over a period. Attacker 130 can also have the capability of replaying previously recorded measurements 218 (i.e., recorded data $y_k$) while attacking by adding malicious data 232 (denoted by $\tilde{y}_k$) to measurements 218 for achieving a sequence of desired control signal 234 (denoted as $u_k^a$). Here, the addition of malicious data 232 to measurements 218 can lead to modified measurements 220. Upon receiving modified measurements 220 instead of measurements 218, controller 112 can generate control signal 222 instead of control signal 234, respectively.

Based on the attack model, design architecture 150 can determine the system dynamics for watermarked system 120 as $x_{k+1}=Ax_k+Bu_k+B^a u_k^a+Dw_k$ and $y_k=Cx_k+D^a y_k^a+v_k$. To mitigate the attack, design architecture 150 can design watermarking system 114 that can inject a physical watermark (e.g., a watermarking signal 224) as a random noise and determine whether system 110 responds to watermarking signal 224 in accordance with the system dynamics.

Design architecture 150 can then determine the state of system 110 in the presence of watermarking signal 224 as $x_{k+1}=Ax_k+Bu_k+B\Delta u_k+Dw_k$ and $y_k=Cx_k+v_k$. In some embodiments, watermarking signal 224 (i.e., signal $\Delta u_k$) can be determined based on Gaussian random variable with zero mean and a predefined covariance. Subsequently, design architecture 150 can determine the strength of watermarking signal 224 and identify the channels of system 110 through which watermarking signal 224 can be injected to control signal 222. Accordingly, watermarking signal 224 can be used to determine watermarking system 114. Upon injection, combined signal 226 can be used for controlling system 110.

Design architecture 150 can also co-design controller 112 to bound the $H_2$ norm. Controller 112 can be represented by $x_{k+1}^c=A_c x_k^c+B_c y_k$ and $u_k=C_c x_k^c+D_c y_k$. Design architecture 150 ensures that the values of $A_c$, $B_c$, $C_c$, and $D_c$ such that the $H_2$ norm is bounded. In addition, design architecture 150 can determine information manager 116 and detector 118. Information manager 116 can obtain modified measurements 220 to determine the system states. Residue 230 (denoted as r) from information manager 116 can be obtained by detector 118 to determine the attack. Residue 230 can be represented by $r=y-c\hat{x}$, wherein $\hat{x}$ can be the system states.

In some embodiments, information manager 116 determine the system states, $\hat{x}$, based on a Kalman filter, and detector 118 can include a $\chi^2$ detector. Here, information manager 116 can operate as the state manager of system 110. Design architecture 150 can represent the output of the Kalman filter as $\hat{x}_{k+1|k+1}=\hat{x}_{k+1|k+1}+\mathbb{L}(y_k-\mathbb{C}\hat{x}_{k+1|k+1})$. The corresponding Kalman gain can then be determined as $\mathbb{L} = \bar{A}\bar{X}\mathbb{C}^T(\overline{\mathbb{C}\bar{X}\mathbb{C}}^T+\mathbb{V})^{-1}$. Based on the Kalman filter of information manager 116, the $\chi^2$ detector of detector 118 can be represented at a time k as $g_k=\Sigma_{i=k-T+1}^k(y_i-C\hat{x}_{i|i-1})^T\chi^{-1}(y_i-C\hat{x}_{i|i-1})$ with respect to $$g_k \lessgtr_{\mathcal{H}_1}^{\mathcal{H}_0} \eta.$$

Here, T can indicate the window size of detection and η can be the threshold indicates the false alarm rate (e.g., the false positive rate for attack detection). For example, $g_k<\eta$ can indicate that system 110 is under normal operation while $g_k>\eta$ can indicate a triggered alarm for an attack on system 110.

Figure 2B:
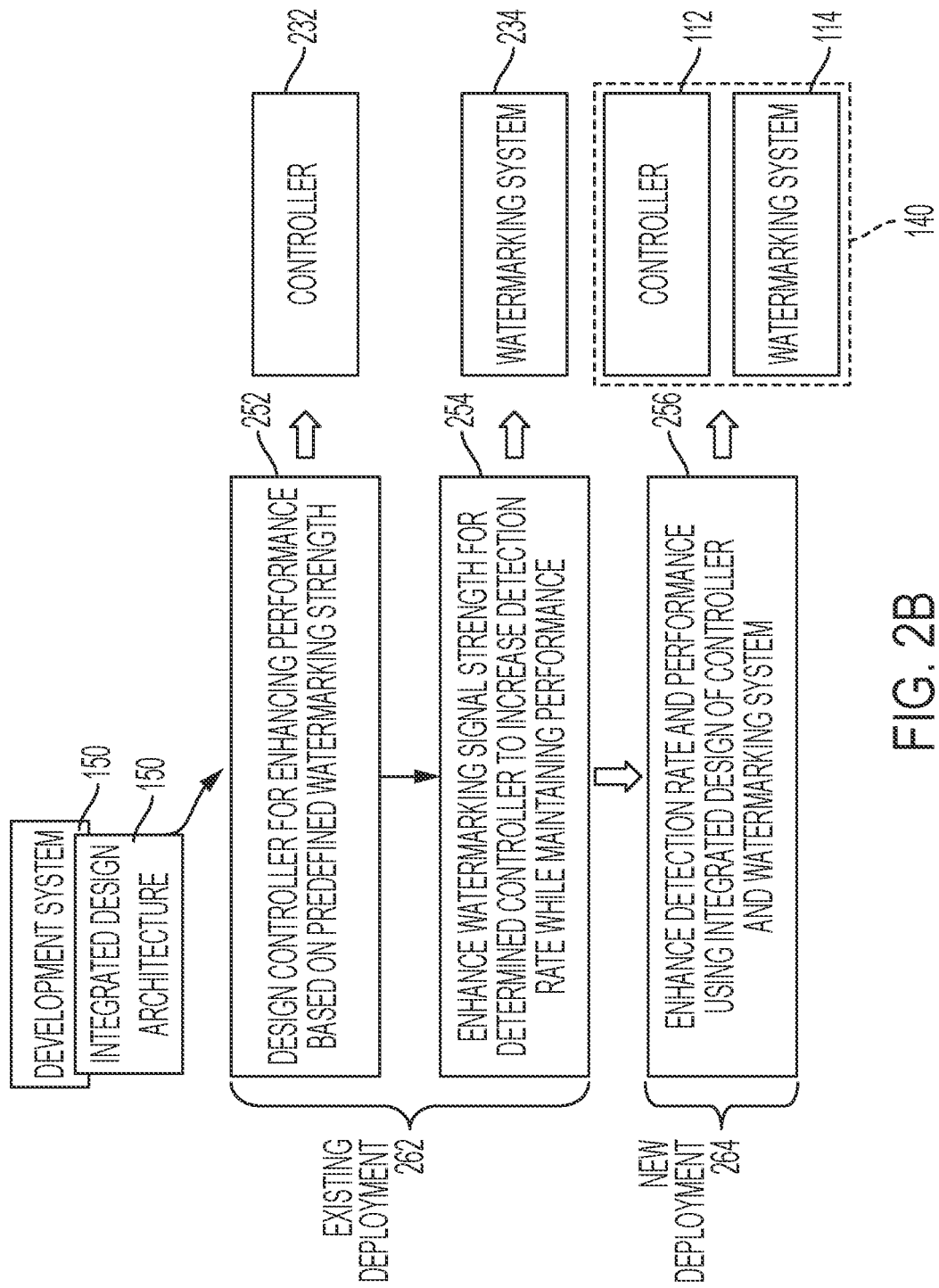
FIG. 2B illustrates an exemplary integrated design for facilitating a watermarked system, in accordance with an embodiment of the present application.

FIG. 2B illustrates an exemplary integrated design for facilitating a watermarked system, in accordance with an embodiment of the present application. For an existing deployment 262, an already-designed system can have an existing controller 232. Here, controller 232 can be designed for enhancing the performance based on a pre-defined watermarking strength (step 252). Design architecture 150 can be used for the development of controller 232 and a Kalman filter for the system with a watermarking signal of a predetermined strength. Because of existing deployment 262, controller 232 may not be redesigned.

Design architecture 150 can then be used to further enhance the watermarking signal for controller 232. Accordingly, design architecture 150 can develop a watermarking system 234 for operating with controller 232. The watermarking signal from watermarking system 234 can increase the detection rate compared to the already deployed watermarking signal of the predetermined strength. Here, design architecture 150 can ensure that the performance level of controller 232 is maintained (step 254). In other words, the performance loss for controller 232 is not further degraded by watermarking system 234.

On the other hand, for a new deployment 264 for a system, design architecture 150 can enhance both the detection rate and the performance using an integrated design of a controller and a watermarking system (step 256). For example, the integrated design 140 of controller 112 and watermarking system 114 can enhance the detection rate and the performance. To facilitate the simultaneous design of watermarking system 112 and controller 114, design architecture 150 can develop a controller (e.g., by determining $A_c$, $B_c$, $C_c$) for a predetermined watermarking signal. Subsequently, for the developed controller, design architecture 150 can develop a watermarking signal. Design architecture 150 can then iterate this process until a convergence is reached.

Figure 3:
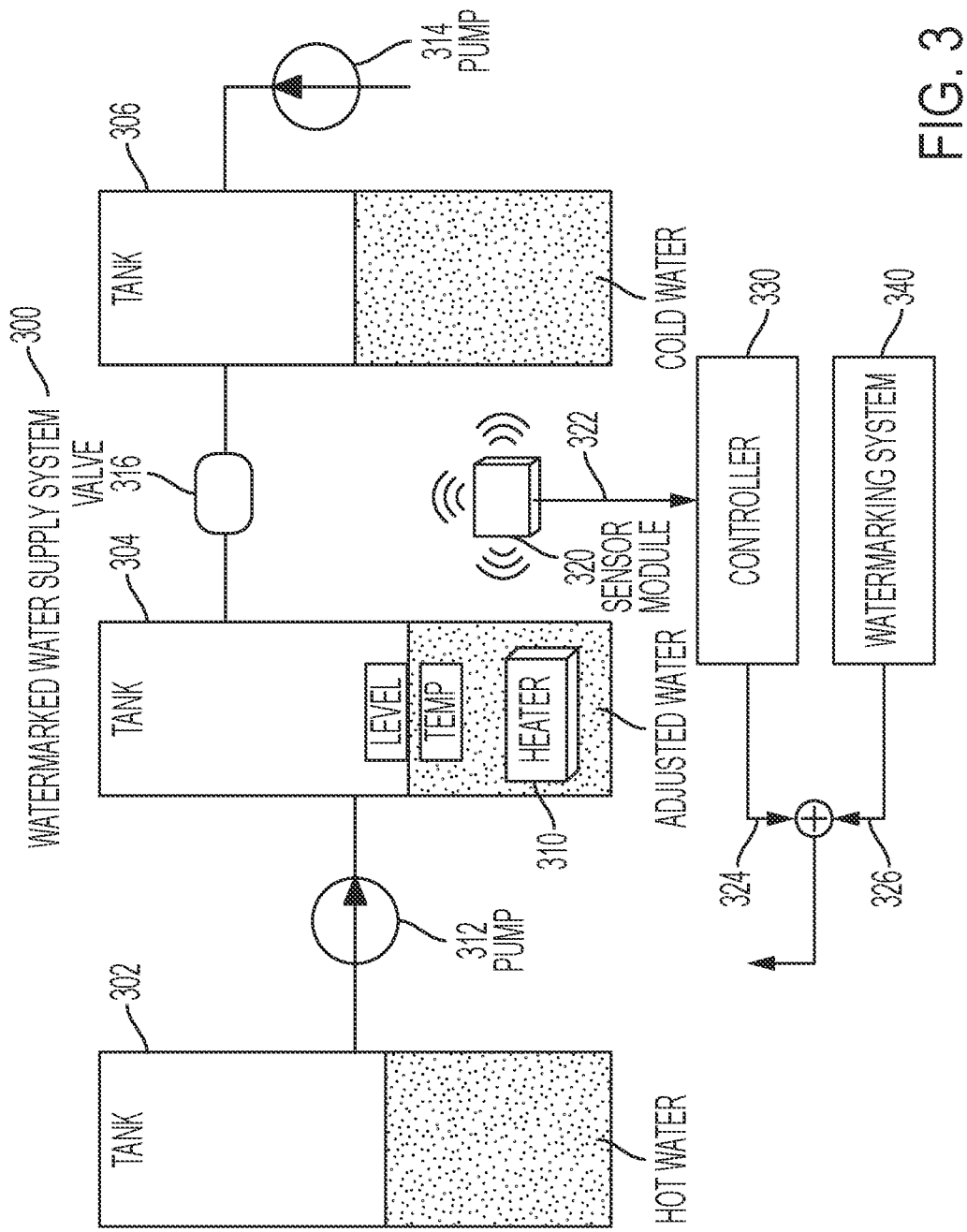
FIG. 3 illustrates an exemplary watermarked water supply system, in accordance with an embodiment of the present application.

FIG. 3 illustrates an exemplary watermarked water supply system, in accordance with an embodiment of the present application. In this example, a watermarked water supply system 300 that can facilitate a controlled chemical process. System 300 can be controlled by a Linear Quadratic Gaussian controller 330 that generates control signal 324 for regulating the output of system 300. A watermarking system 340 can be embedded into system 300 for injecting watermarking signal 326 into control signal 324.

System 300 can include water tanks 302, 304, and 306 for hot water, adjusted water, and cold water, respectively. Hence, the system state, $x_k$, can indicate the level of water in tanks 304 and 306, and the temperature of water in tank 304 at time instance k. The control inputs, $u_k$, can be respective control signals to flow pumps 312 and 314, valve 316, and heater 310 from controller 330. The objective of controller 330 is to regulate state vector around a reference value that dictates the target level of water in tanks 304 and 306, and the target temperature of water in tank 304.

System 300 can include a sensor module 320 that can provide sensor measurements 322 indicative of water levels in tanks 304 and 306, and water temperature of tank 304. In some embodiments, system 300 can be over-observed by s sensors in sensor module 320. An attacker can record measurements 322 over a period and replay the recorded measurements while attacking system 300 by adding malicious data to measurements 322 for achieving a sequence of desired control signal from controller. Watermarking signal 326 allows a detector to determine the replayed measurements and detect the attack on system 300.

Operations

Figure 4:
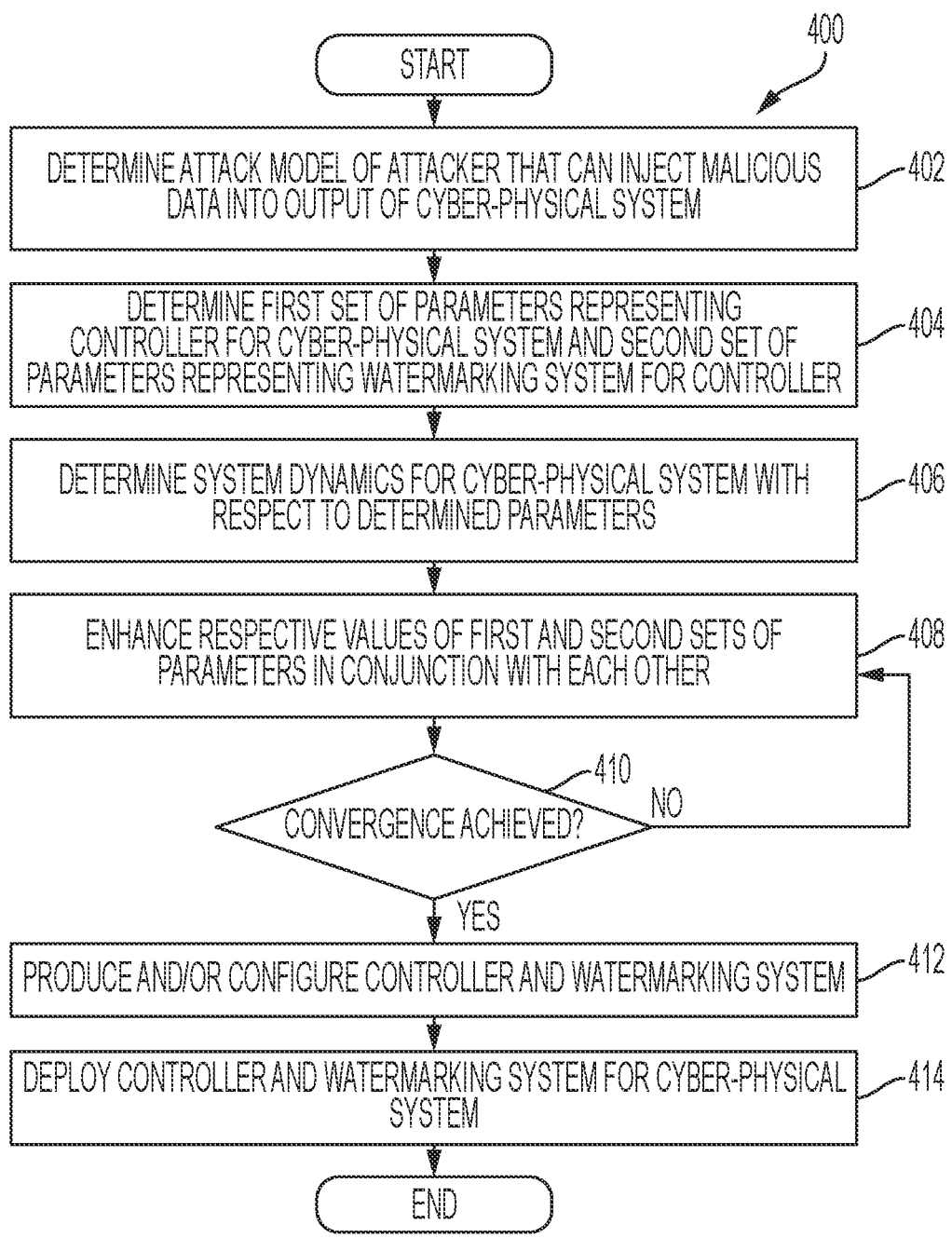
FIG. 4 presents a flowchart illustrating a method of an integrated design architecture facilitating a controller and a watermarking process in conjunction with each other for a cyber-physical system, in accordance with an embodiment of the present application.

FIG. 4 presents a flowchart 400 illustrating a method of an integrated design architecture facilitating a controller and a watermarking process in conjunction with each other for a cyber-physical system, in accordance with an embodiment of the present application. During operation, the design architecture can determine an attack model of an attacker that can inject malicious data into the output (e.g., sensor measurements) of the cyber-physical system (operation 402). The design architecture can then determine a first set of parameters representing a controller for the system and a second set of parameters representing a watermarking system for the controller (operation 404).

The design architecture can determine the system dynamics for the system with respect to the determined parameters (operation 406). Subsequently, the design architecture can enhance the respective values of the first and second sets of parameters in conjunction with each other (operation 408). For example, the design architecture can enhance the respective values of the first set of parameters for a set of values for the second sets of parameters. The design architecture can then enhance respective values of the second set of parameters for the enhanced values for the second sets of parameters.

The design architecture can then determine whether convergence has been achieved for the first and second sets of parameters (operation 410). The convergence can be detected if the performance and the detection rate are not further enhanced by the first and second sets of parameters within a threshold level. If convergence has not been achieved, the design architecture can continue to enhance the respective values of the first and second sets of parameters in conjunction with each other (operation 408). On the other hand, if convergence has been achieved, the design architecture can produce and/or configure the controller and the watermarking system (operation 412). The design architecture can also deploy the controller and the watermarking system for the cyber-physical system (operation 414).

Figure 5:
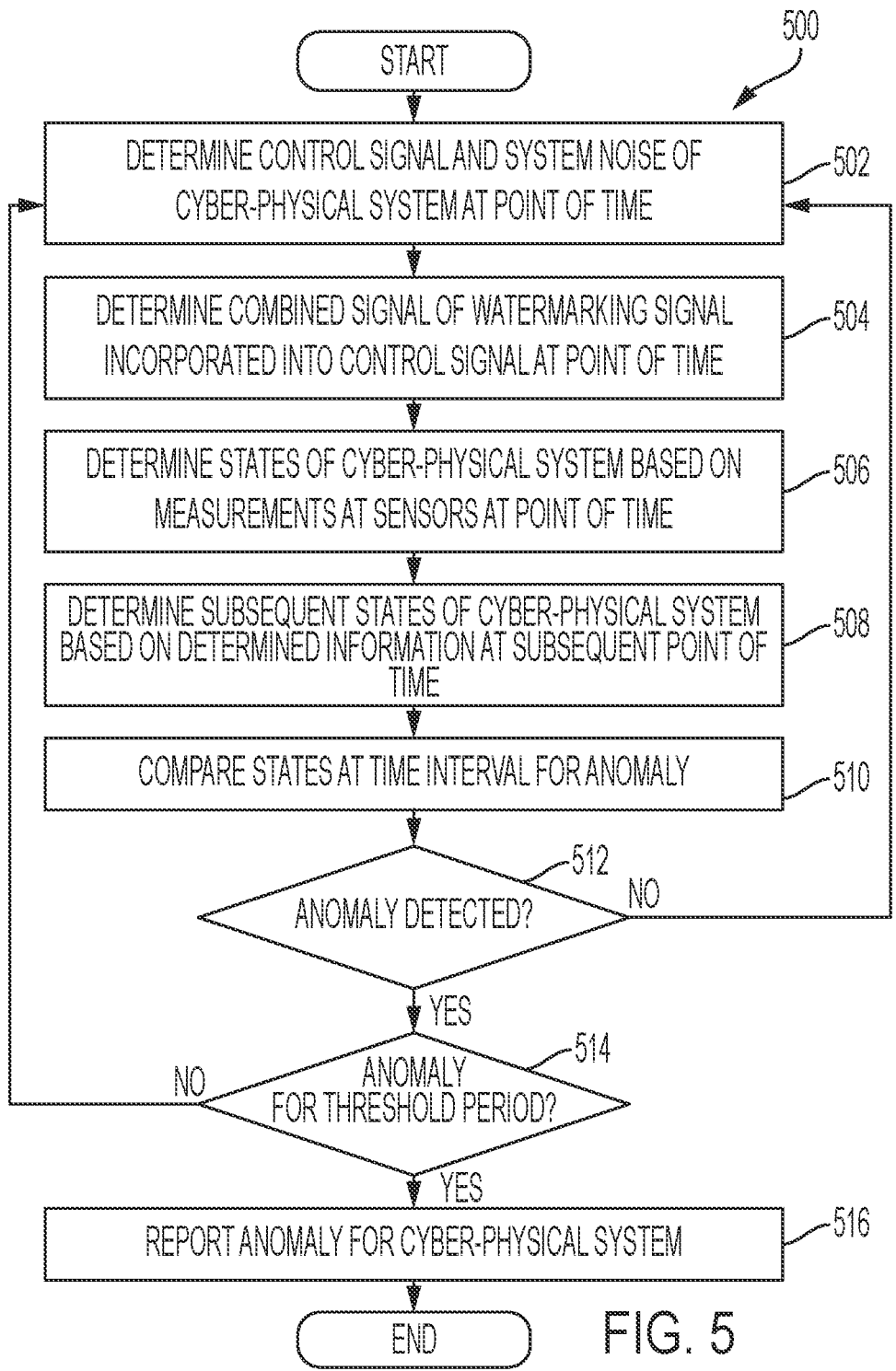
FIG. 5 presents a flowchart illustrating a method of a detector of a cyber-physical system determining an anomaly using watermarking, in accordance with an embodiment of the present application.

FIG. 5 presents a flowchart 500 illustrating a method of a detector of a cyber-physical system determining an anomaly using watermarking, in accordance with an embodiment of the present application. During operation, the detector can determine the control signal and the system noise of the cyber-physical system at a point of time (operation 502). The detector can then determine the combined signal of the watermarking signal incorporated into the control signal at the point of time (operation 504).

Subsequently, the detector can determine the states of the cyber-physical system based on the measurements at sensors at the point of time (operation 506). The detector can determine the subsequent state of the cyber-physical system based on the determined information at a subsequent point of time (operation 508) and compare the states at the time interval for anomaly (operation 510). The detector can then determine whether anomaly is detected (operation 512).

If anomaly is detected, the detector can determine whether the anomaly is present for threshold period (operation 514). If anomaly is not detected (operation 514) for a threshold period (operation 514), the detector can continue to determine the control signal and the system noise of the cyber-physical system at a subsequent point of time (operation 502). On the other hand, if the anomaly is present for threshold period, the detector can report the anomaly for the cyber-physical system (operation 516).

Exemplary Computer System and Apparatus

Figure 6:
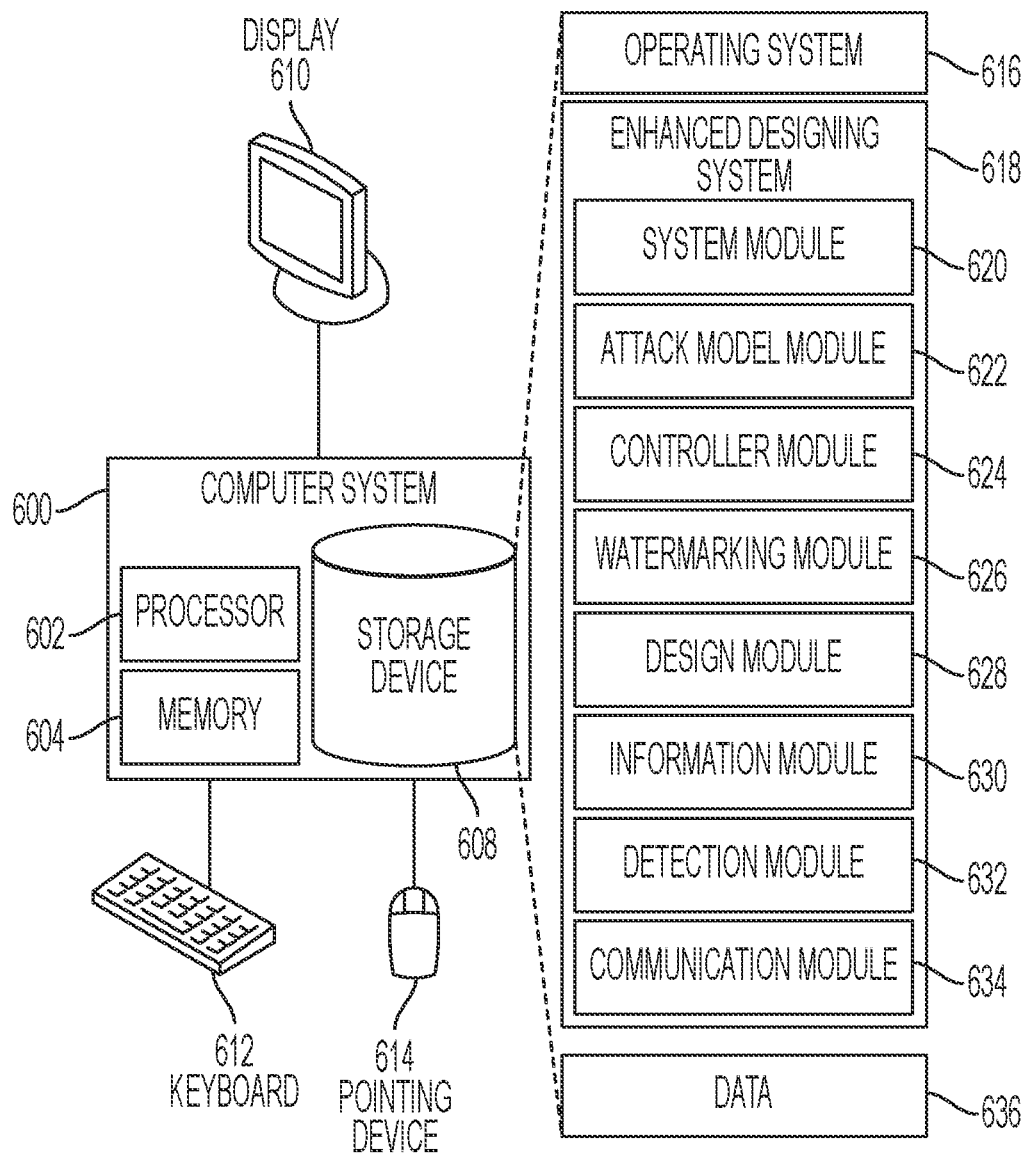
FIG. 6 illustrates an exemplary computer system that facilitates an integrated design framework for providing a watermarked system, in accordance with an embodiment of the present application.

FIG. 6 illustrates an exemplary computer system that facilitates an integrated design framework for providing a watermarked system, in accordance with an embodiment of the present application. Computer system 600 includes a processor 602, a memory device 604, and a storage device 608. Memory device 604 can include a volatile memory device (e.g., a dual in-line memory module (DIMM)). Furthermore, computer system 600 can be coupled to a display device 610, a keyboard 612, and a pointing device 614. Storage device 608 can store an operating system 616, an enhanced designing system 618, and data 636. Enhanced designing system 618 can facilitate the operations of design architecture 150.

Enhanced designing system 618 can include instructions, which when executed by computer system 600 can cause computer system 600 to perform methods and/or processes described in this disclosure. Specifically, enhanced designing system 618 can include instructions for obtaining system dynamics of a cyber-physical system (system module 620). Here, the cyber-physical system can be a watermarked system. Enhanced designing system 618 can also include instructions for determining an attack model that can represent an attack on the cyber-physical system by a malicious actor (attack model module 622). Enhanced designing system 618 can also include instructions for incorporating the properties of the attack and the capabilities of the malicious actor into the attack model (attack model module 622).

Furthermore, enhanced designing system 618 includes instructions for determining a controller that can control the operations of the cyber-physical system for a predetermined watermarking signal strength (controller module 624). Enhanced designing system 618 can also include instructions for enhancing the watermarking signal strength for the determined controller (watermarking module 626). Moreover, enhanced designing system 618 can include instructions for co-designing the controller and the watermarking signal by iterating the determination process until a convergence is reached (i.e., the performance and the detection rate are not further enhanced within a threshold level) (design module 628).

Enhanced designing system 618 can further include instructions for determining an information manager that can determine the states of the cyber-physical system (e.g., using a Kalman filter) (information module 630). Enhanced designing system 618 can also include instructions for detecting an attack on the cyber-physical system based on the watermarking signal, such as a $\chi^2$ detector (detection module 632). Enhanced designing system 618 may further include instructions for sending and receiving messages (communication module 634). Data 636 can include any data that can facilitate the operations of design architecture 150 of FIG. 1. Data 636 may include respective values of the sets of parameters corresponding to a controller and a watermarking system.

Figure 7:
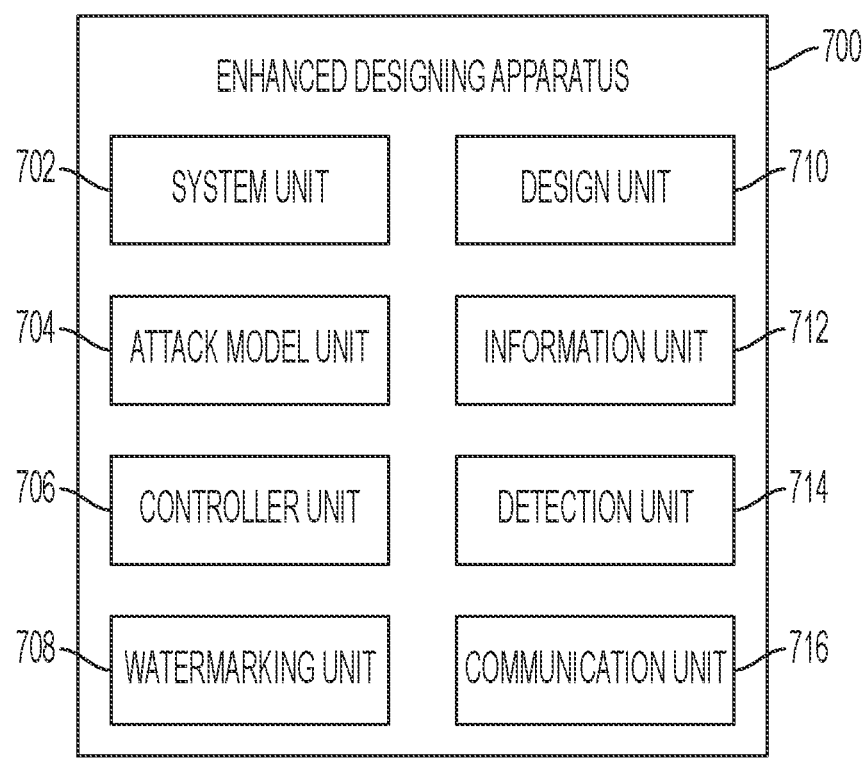
FIG. 7 illustrates an exemplary apparatus that facilitates an integrated design framework for providing a watermarked system, in accordance with an embodiment of the present application.

FIG. 7 illustrates an exemplary apparatus that facilitates an integrated design framework for providing a watermarked system, in accordance with an embodiment of the present application. Enhanced designing apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Specifically, apparatus 700 can comprise units 702-716, which perform functions or operations similar to modules 620-634 of computer system 600 of FIG. 6, including: a system unit 702; an attack model unit 704; a controller unit 706; a watermarking unit 708; a design unit 710; an information unit 712, a detection unit 714, and a communication unit 716.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-executable method for co-designing a controller and a watermarking signal for a cyber-physical system, the method comprising:
   determining a first set of values of a first set of parameters indicating operations of the controller based on an initial set of values of a second set of parameters representing the watermarking signal, wherein the watermarking signal is a type of signal combinable with a control signal from the controller for monitoring an output signal of the cyber-physical system for detecting malicious data at a plurality of time instances;
   determining a second set of values of the second set of parameters based on the first set of values;
   determining a state manager based on the first and second sets of values, wherein the state manager determines states of the cyber-physical system from the monitored output signal; and
   determining a detector capable of identifying presence of an attack from the states of the cyber-physical system at the plurality of time instances using the watermarking signal.

2. The method of claim 1, wherein the attack comprises replaying a previously recorded output of the cyber-physical system.

3. The method of claim 1, wherein determining the first and second sets of values further comprises:
   enhancing a set of predetermined values of the first set of parameters based on the initial set of values of the second set of parameters to generate the first set of values; and
   enhancing the initial set of values of the second set of parameters based on the first set of values to generate the second set of values.

4. The method of claim 3, wherein enhancing a respective set of values further comprises iterating the enhancement until a convergence is reached.

5. The method of claim 3, wherein the generation of the first set of values corresponds to a performance metric for the cyber-physical system; and
   wherein the generation of the second set of values corresponds to a detection rate for the attack.

6. The method of claim 1, wherein determining the first and second sets of values further comprises:
   identifying the first set of values of the first set of parameters based on the initial set of values of the second set of parameters, wherein the first set of values is associated with the controller is existing in the cyber-physical system; and
   enhancing the initial set of values of the second set of parameters based on the identified first set of values to generate the second set of values.

7. The method of claim 1, wherein the state manager includes a Kalman filter for determining the states of the cyber-physical system.

8. The method of claim 1, wherein the detector includes a chi-square detector for detecting the attack.

9. The method of claim 1, further comprising bounding the first set of values of the first set of parameters to a norm indicating that the controller is a stable dynamic feedback controller.

10. A non-transitory computer-readable storage medium storing instructions that when executed by a computer cause the computer to perform a method for co-designing a controller and a watermarking signal for a cyber-physical system, the method comprising:
    determining a first set of values of a first set of parameters indicating operations of the controller based on an initial set of values of a second set of parameters representing the watermarking signal, wherein the watermarking signal is a type of signal combinable with a control signal from the controller for monitoring an output signal of the cyber-physical system for detecting malicious data at a plurality of time instances;
    determining a second set of values of the second set of parameters based on the first set of values;
    determining a state manager based on the first and second sets of values, wherein the state manager determines states of the cyber-physical system from the monitored output signal; and
    determining a detector capable of identifying presence of an attack from the states of the cyber-physical system at the plurality of time instances using the watermarking signal.

11. The non-transitory computer-readable storage medium of claim 10, wherein the attack comprises replaying a previously recorded output of the cyber-physical system.

12. The non-transitory computer-readable storage medium of claim 10, wherein determining the first and second sets of values further comprises:
    enhancing a set of predetermined values of the first set of parameters based on the initial set of values of the second set of parameters to generate the first set of values; and
    enhancing the initial set of values of the second set of parameters based on the first set of values to generate the second set of values.

13. The non-transitory computer-readable storage medium of claim 12, wherein enhancing a respective set of values further comprises iterating the enhancement until a convergence is reached.

14. The non-transitory computer-readable storage medium of claim 12, wherein the generation of the first set of values corresponds to a performance metric for the cyber-physical system; and
wherein the generation of the second set of values corresponds to a detection rate for the attack.

15. The non-transitory computer-readable storage medium of claim 10, wherein determining the first and second sets of values further comprises:
identifying the first set of values of the first set of parameters based on the initial set of values of the second set of parameters, wherein the first set of values is associated with the controller existing in the cyber-physical system; and
enhancing the initial set of values of the second set of parameters based on the identified first set of values to generate the second set of values.

16. The non-transitory computer-readable storage medium of claim 10, wherein the state manager includes a Kalman filter for determining the states of the cyber-physical system.

17. The non-transitory computer-readable storage medium of claim 10, wherein the detector includes a chi-square detector for detecting the attack.

18. The non-transitory computer-readable storage medium of claim 10, further comprising bounding the first set of values of the first set of parameters to a norm indicating that the controller is a stable dynamic feedback controller.

19. A computer system, comprising:
a storage device;
a processor;
a non-transitory computer-readable storage medium storing instructions, which when executed by the processor causes the processor to perform a method for co-designing a controller and a watermarking signal for a cyber-physical system, the method comprising:
determining a first set of values of a first set of parameters indicating operations of the controller based on an initial set of values of a second set of parameters representing the watermarking signal, wherein the watermarking signal is a type of signal combinable with a control signal from the controller for monitoring an output signal of the cyber-physical system for detecting malicious data at a plurality of time instances;
determining a second set of values of the second set of parameters based on the first set of values;
determining a state manager based on the first and second sets of values, wherein the state manager determines states of the cyber-physical system from the monitored output signal; and
determining a detector capable of identifying presence of an attack from the states of the cyber-physical system at the plurality of time instances using the watermarking signal.

20. The computer system of claim 19, wherein determining the first and second sets of values further comprises:
enhancing a set of predetermined values of the first set of parameters based on the initial set of values of the second set of parameters to generate the first set of values; and
enhancing the initial set of values of the second set of parameters based on the first set of values to generate the second set of values.

* * * * *